Dec. 9, 1930. D. F. NEWMAN 1,783,973
PROJECTION SCREEN
Filed July 21, 1926

INVENTOR.
David F. Newman
BY
William S. Pritchard.
ATTORNEY.

Patented Dec. 9, 1930

1,783,973

UNITED STATES PATENT OFFICE

DAVID F. NEWMAN, OF FREEPORT, NEW YORK, ASSIGNOR TO TRANS-LUX DAYLIGHT PICTURE SCREEN CORPORATION, OF NEW YORK, N. Y., A CORPORATION OF DELAWARE

PROJECTION SCREEN

Application filed July 21, 1926. Serial No. 123,843.

This invention relates to a novel and improved projection screen and method of making the same.

One of the objects of my invention is to provide a projection screen which will make possible the observation of an image projected thereon without the appearance of distortion which is so commonly prevalent when the projected image is viewed at an angle to the screen other than a right angle.

Another object of my invention is to provide a method which may be employed in the manufacture of a screen and which shall result in a screen of rugged character and having the desired optical properties, at the same time being cheaply and efficiently made.

My screen may be of the type known as a reflecting screen or of the type known as a translucent screen. It is another object of my invention to provide a screen which, particularly when it is of the translucent type, will diffuse the light reaching it so that the source of light will not form a spot on the screen as is usually the case with prior art screens, particularly with the translucent type.

According to my invention I form my screen of a suitable base having applied to one or both surfaces thereof a coating of latex, which is the name applied to the milk obtained from the rubber tree. The material which I have found to be very satisfactory is what is known as normal latex. This may consist of approximately: solids, 37.2% by weight, water balance. The solids are composed of approximately 96% rubber by weight, the rest being impurities. Ammonia may be added to the solids as a preservative, the amount for the above example being approximately 0.68% by weight.

The above latex compound may have added thereto a suitable diffuser, such as casein, zinc oxide, calcium tungstate, ammonium silico fluoride, or lithium fluoride. The above are given merely as examples of suitable diffusers which have been found satisfactory and not as limiting the invention. If desired formaldehyde may be added as a further preservative and for other desirable effects, such as hardening.

Figure 1:
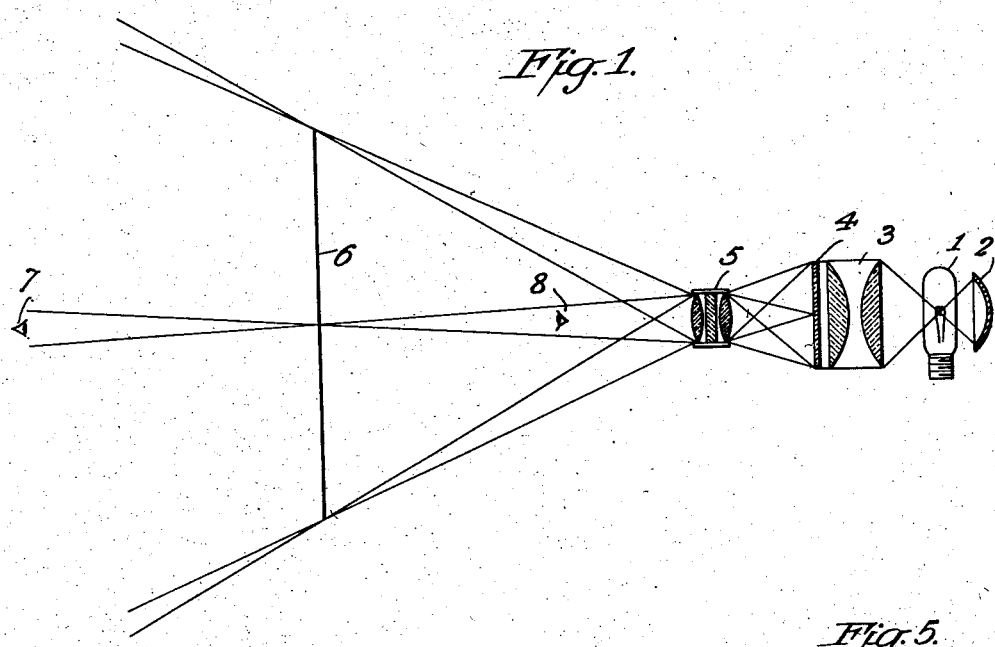
Figure 1 shows a diagrammatic view of a screen in its relation to the optical system of a projector.

The numeral 1 designates a suitable light behind which is disposed the reflector 2. The light from the lamp and from the reflector is received in the condenser 3 and projected thereby through the object 4 to the objective 5. The object 4 may be of the usual type such as a slide or film. From the objective the beam of light passes to the screen 6 which may be either translucent or reflecting. If it is of the translucent type the eye of the observer occupies some such position as that indicated at 7 while if it is of the reflecting type the eye of the observer occupies some such position as that indicated at 8. A screen constructed according to my invention may be of either type referred to above.

Figure 2:
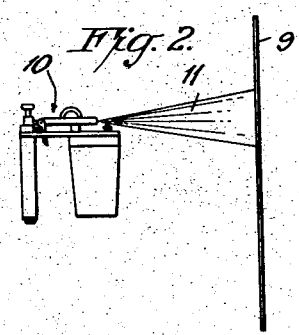
Figure 2 is a diagrammatic view showing one method of practicing my invention.
Figure 4:
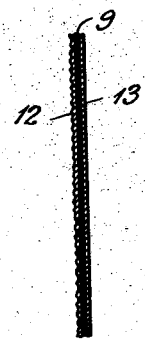
Figure 4 is a fragmentary sectional view through a screen.

The method which I prefer to employ in making a screen according to my invention comprises providing a suitable base indicated at 9 in Figures 2 and 4 and spraying upon that base the compound solution of latex and diffuser. For this purpose any suitable spraying device 10 may be employed which will form the solution into the spray 11. The base will vary in character according to the character of the screen which is desired. If a flexible screen is wanted then the base may comprise some such substance as silk while if it is desired to have a screen which is relatively stiff then the base may be made, for example, of glass or celluloid. Other substances which have been found to be satisfactory are cotton, linen, paper, tracing cloth, gelatin, glue and bakelite. The above materials are given merely as example and not as an exhaustive list of all possible bases. If the base is formed of a fabric such as cotton, silk or linen this material should be first boiled off to eliminate the gums or resinous materials therein. When so treated a fabric, and in particular a silk fabric, will diffuse light passing therethrough and will become invisible to the eye after incorporation in a translucent screen. This characteristic may be better explained by saying that the fabric not only becomes impregnated with the composition of the screen but remains so and does not dry out. That is, it becomes and stays wet so far as the optical properties of the screen are concerned.

Figure 3:
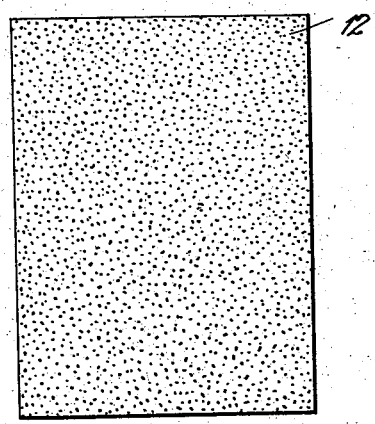
Figure 3 is a view of one face of a screen.

The compound solution of latex and diffuser is preferably sprayed upon both sides of the base. If the base be a fabric, then the material sprayed upon one side will pass through the fabric to some extent and should be permitted to partially dry before spraying upon the other side. The compound dries into a pebbly formation which forms a roughened surface aiding in giving the desired diffusion to the light passing through the screen and the surface will be rough as indicated at 12 in Figures 3 and 4. The other side of the base may then be sprayed and if desired this side may be brushed smooth as shown at 13 in Figure 4. The size of the pebbles formed in the latex compound increases with the amount of spraying up to a certain point so that if a surface with large pebbles thereon is desired it may be obtained in this manner. Obviously both sides may be pebbly or smooth or one may be smooth and the other pebbly, as may be found most expedient for the use to which a screen may be put.

Figure 5:
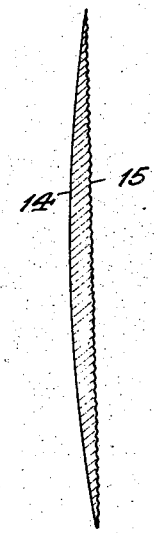
Figure 5 is a cross section of one form that my screen may take.

In Figure 5 I have shown the screen as taking the form described and claimed in my copending application, Serial No. 123,842, filed July 21, 1926, as having one curved surface 14 and a relatively flat surface 15, the surface 14 being shown smooth and the surface 15 being shown pebbly. This form may be achieved by building up one side of the screen as by depositing additional layers of latex compound in a manner which will be apparent to those skilled in the art.

A screen constructed by the method described above may be so made as to be used as a reflecting screen or if desired may be made translucent in order to form a screen which transmits light therethrough. When made for a reflecting screen it obviously should be made heavier and more nearly opaque so as to reflect light to the projector rather than to transmit it through the screen, where it would be wasted. This characteristic may be obtained also by increasing the diffuser used in the latex. Latex, when compounded in the manner set forth above, is naturally brilliant and will reflect a great deal of the light striking a screen made thereof. The pebbly formation of the latex compound provides means for diffusing the light coming through a screen or striking the same from the front and adequately prevents the formation of a spot of light on the screen. The same formation results in a lack of distortion. The image on the screen may be viewed directly from the front thereof or from a position such that the line of sight will form a large angle with a perpendicular to the screen without distortion.

I am aware that various changes from the above disclosure may be made without departing from the spirit and scope of my invention and I, therefore, do not desire to limit myself except by the appended claims.

In the appended claims, the term "latex" shall be understood as referring exclusively to latex of rubber-producing plants or trees.

I claim:

1. A projection screen comprising a base having a coating formed from latex having a diffuser therein.

2. A translucent projection screen comprising a base having a coating formed from normal latex.

3. A translucent projection screen comprising a base having a coating formed from latex.

4. A projection screen comprising a base and a coating formed from latex on both sides thereof.

5. A projection screen comprising a fabric base having a coating formed from latex.

6. A projection screen comprising a fabric base and a coating formed from latex on both sides thereof, one of said coatings being rough and the other being smooth.

7. A translucent projection screen comprising a base and a coating formed from latex on both sides thereof.

8. A translucent projection screen comprising a fabric base having a coating formed from latex thereon.

9. A projection screen comprising a boiled-off fabric base having a coating formed from latex.

10. A projection screen comprising a boiled-off fabric base having a coating formed from latex and having a diffuser therein.

11. A translucent projection screen comprising a boiled-off fabric base having a coating formed from normal latex.

12. A translucent projection screen comprising a boiled-off fabric base having a coating formed from latex.

13. A projection screen comprising a boiled-off fabric base and a coating formed from latex on both sides thereof.

14. A projection screen comprising a boiled-off fabric base having a coating formed from latex.

15. A projection screen comprising a boiled-off fabric base and a coating formed from latex on both sides thereof, one of said coatings being rough and the other being smooth.

16. A translucent projection screen comprising a degummed silk fabric base having a coating formed from latex thereon.

17. A translucent projection screen comprising a degummed silk fabric base having a coating formed from latex and having a diffuser therein.

In testimony whereof, I have affixed my signature to this specification.

DAVID F. NEWMAN.